(12) United States Patent
Schuck et al.

(10) Patent No.: US 12,287,265 B2
(45) Date of Patent: Apr. 29, 2025

(54) FLUORESCENCE SCANNING SYSTEM FOR ANALYTICAL ULTRACENTRIFUGATION

(71) Applicant: THE UNITED STATES OF AMERICA, as represented by the Secretary, Department of Health and Human Services, Bethesda, MD (US)

(72) Inventors: Peter W. Schuck, Bethesda, MD (US); John W. Kakareka, Bethesda, MD (US); Thomas J. Pohida, Bethesda, MD (US); George Patterson, Bethesda, MD (US); Hauying Zhao, Bethesda, MD (US)

(73) Assignee: THE UNITED STATES OF AMERICA, AS REPRESENTED BY THE SECRETARY, DEPARTMENT OF HEALTH AND HUMAN SERVICES, Bethesda, MD (US)

( * ) Notice: Subject to any disclaimer, the term of this patent is extended or adjusted under 35 U.S.C. 154(b) by 1055 days.

(21) Appl. No.: 17/192,623

(22) Filed: Mar. 4, 2021

(65) Prior Publication Data
US 2021/0278328 A1    Sep. 9, 2021

Related U.S. Application Data

(60) Provisional application No. 62/985,222, filed on Mar. 4, 2020.

(51) Int. Cl.
*G01N 1/40* (2006.01)
*G01N 21/64* (2006.01)

(52) U.S. Cl.
CPC .......... *G01N 1/4077* (2013.01); *G01N 21/645* (2013.01); *G01N 2021/6478* (2013.01); *G01N 2201/0636* (2013.01)

(58) Field of Classification Search
CPC .......... G01N 1/4077; G01N 2021/6478; G01N 21/645; G01N 2201/0636; G01N 2001/4083; G01N 2035/00495
USPC ....................................................... 356/417
See application file for complete search history.

(56) References Cited

U.S. PATENT DOCUMENTS

2013/0109022 A1* 5/2013 Hwang ................. B01L 7/52
                                                              435/6.12

* cited by examiner

*Primary Examiner* — Tri T Ton
(74) *Attorney, Agent, or Firm* — McCoy Russell LLP

(57) ABSTRACT

The present disclosure provides various embodiments of a fluorescence scanning system having a sample holder with a sample suspended within that is rotated by a centrifuge such that the sample is illuminated at various angles by an excitation beam by operation of a galvanometer and such that the sample emits a fluorescence emissions that is detected through a narrow window of exposure defined along the travel path of rotation taken by the sample holder when rotated by the centrifuge. A stationary fluorescence detector is in operative communication with the sample holder along the narrow window of exposure for detecting the fluorescence emissions emitted by the sample from the sample holder while also separating the excitation beam from the fluorescence emissions.

15 Claims, 3 Drawing Sheets

FLUORESCENCE SCANNING SYSTEM FOR ANALYTICAL ULTRACENTRIFUGATION

CROSS-REFERENCE TO RELATED APPLICATION

This application claims the benefit of priority of U.S. Provisional Application No. 62/985,222, filed Mar. 4, 2020, the entire contents of which are hereby incorporated by reference.

FIELD

The present disclosure relates to a fluorescence detector. More particularly, the present disclosure relates to a fluorescence scanning system for analytical ultracentrifugation having a novel sample holder and scanning arrangement.

BACKGROUND

Analytical ultracentrifugation is a classical technique for the study of macromolecules and particulates suspended in a solution. An analytic ultracentrifuge (AUC) functions by measuring the radial concentration distribution of particles in real-time after application of a centrifugal field, and then mathematically analyzing the concentration distributions as they evolve over time. Samples in an AUC are enclosed in centrifuge holders with transparent windows, such that the radial concentration distributions are measured in real-time through synchronized axial optical systems based on interferometry, absorbance, or fluorescence scanners. Analytical ultracentrifugation occurs in a rotor chamber under high vacuum and with little space for optical elements; consequently, detection of fluorescence emissions from a sample can be difficult in an AUC due to space constraints. In view of the foregoing, there is a need for improved analytical ultracentrifugation systems and methods that enable detection of fluorescence emissions.

SUMMARY

The present disclosure provides an analytical ultracentrifuge (AUC) system including movable galvanometer mirrors that may be used to manipulate the spatial location (e.g., radial position of the sample volume) probed by an excitation beam in an analytical ultracentrifuge (AUC), thereby greatly simplifying integration of a fluorescence detector into an AUC system. In embodiments, the galvanometer mirror may change the angle of a collimated excitation beam, thereby modulating the position it probes in a rotating sample with the AUC system, thereby allowing sample to be radially scanned. In this regard, the excitation beam does not need to traverse the sample parallel to the axis of sample rotation, and deviations may be accounted for computationally during data analysis.

In an aspect, the disclosure provides a fluorescence scanning system that includes a centrifuge defining a chamber and a rotor extending laterally across the chamber, wherein the rotor is operable for rotation about an axis of the centrifuge; a sample holder engaged to the rotor for rotation of the sample holder along a travel path, the sample holder defining an inner chamber wherein a proximal plano-convex lens window is positioned at a first end of the sample holder and a distal plano-convex lens window is positioned at an opposite second end of the sample holder; a sample disposed inside the inner chamber of the sample holder; an illumination source for generating and transmitting a collimated excitation beam; a galvanometer in operative association with the illumination source for scanning the collimated excitation beam at different angles along the sample disposed within the sample holder; a stationary mirror in operative communication with the galvanometer for transmitting the collimated excitation beam into the sample holder through the proximal plano-convex lens window and illuminating the sample to generate fluorescence emissions; and a stationary fluorescence detector in operative communication with the sample holder at a point along the travel path of rotation of the sample holder for detecting the fluorescence emissions and collimated excitation beam emitted from the sample holder.

In some embodiments, the stationary fluorescence detector comprises a dichroic mirror operable for separating the collimated excitation beam from the fluorescence emissions emitted from the sample holder such that the collimated excitation beam is deflected by the dichroic mirror and the fluorescence emissions passes through the dichroic mirror.

In some embodiments, the proximal plano-convex lens window is configured to focus the collimated excitation beam along different angles along the sample.

In some embodiments, the distal plano-convex lens window is configured to focus the fluorescence emissions emitted by the sample to the stationary fluorescence detector.

In some embodiments, the proximal plano-convex lens window and the distal plano-convex lens window comprise a sapphire lens.

In some embodiments, the proximal plano-convex lens window and the distal plano-convex lens window each comprise a convex portion that allows the excitation beam to have a more parallel orientation relative to the axis of rotation of the rotor of the centrifuge.

In some embodiments, the stationary mirror is oriented at a 45 degree angle relative to the galvanometer.

In some embodiments, the sample is suspended in a liquid within the inner chamber of the sample holder.

In some embodiments, the stationary fluorescence detector comprises a first detection lens for focusing the excitation beam and the operable for separating the excitation beam from the fluorescence emissions.

In some embodiments, the dichroic mirror is operable for deflecting the excitation beam off the dichroic mirror while allowing the fluorescence emissions to pass through the dichroic mirror.

In some embodiments, the proximal plano-convex lens window is configured to modulate the angle of entry of the excitation beam into the sample.

In some embodiments, the sample is scanned radially by the excitation beam.

In some embodiments, the centrifuge defines opposing apertures for permitting illumination of the sample by the excitation beam and detection of the fluorescence emissions along a one to three degree window defined along the travel path of the sample holder.

In some embodiments, the sample is exposed for illumination and detection in a 1 microsecond period of time along the travel path of the sample holder.

In some embodiments, the proximal plano-convex lens window defines a convex portion and an opposite plano portion and wherein the distal plano-convex lens window also defines a convex portion and an opposite plano portion, wherein the plano portions of the distal and proximal plano-convex lens windows communicate with the inner chamber of the sample holder and the convex portions of the distal and proximal plano-convex lens windows communicate with the exterior of the sample holder.

DESCRIPTION OF THE DRAWINGS

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. Corresponding reference characters indicate corresponding elements among the view of the drawings. One of ordinary skill in the art will appreciate that in some examples one element may be designed as multiple elements or that multiple elements may be designed as one element. Furthermore, elements may not be drawn to scale.

DETAILED DESCRIPTION

The present disclosure is based, at least in part, on the discovery that movable galvanometer mirrors may be used to manipulate the spatial location (e.g., radial position of the sample volume) probed by an excitation beam in an analytical ultracentrifuge (AUC), thereby greatly simplifying integration of a fluorescence detector into an AUC system. In embodiments, the galvanometer mirror may change the angle of a collimated excitation beam, thereby modulating the position it probes in a rotating sample with the AUC system, thereby allowing sample to be radially scanned. In this regard, the excitation beam does not need to traverse the sample parallel to the axis of sample rotation, and deviations may be accounted for computationally during data analysis.

Fluorescence detection in analytical centrifugation has been shown to greatly extend the concentration range of analytical ultracentrifugation, thereby permitting novel applications to the characterization of ultra-high affinity protein interactions, such as antibody-antigen interactions. In addition, fluorescence detection in analytical centrifugation has been applied to applications related to the study of tracer proteins in highly concentrated solutions, which facilitates the characterization of protein pharmaceuticals in serum or formulation conditions. Since analytical ultracentrifugation occurs in a rotor chamber with high vacuum and little space for optical elements, it has been found that the use of mirrors to manipulate the spatial location (e.g., radial position of the sample volume) probed by the excitation beam greatly simplifies the detector design as disclosed herein.

In one aspect, the fluorescence scanning system includes a novel sample holder that rotates around the axis of centrifugation and includes a distal plano-convex lens window at one end of the sample holder for directing a plurality of excitation beams along a sample suspended within the chamber of the sample holder and an opposite proximal plano-convex lens window that focuses fluorescence emissions emitted by the sample after excitation to a stationary fluorescence detector for detection.

In another aspect, the sample within the sample holder is excited by the excitation beams and the fluorescence emissions emitted by the sample are detected along about a one to three degree window (e.g., one microsecond of exposure) as the sample holder is rotated along a 360 degree path by the centrifuge. In a further aspect, a single excitation beam generated by an illumination source is converted to a plurality of excitation beams by a galvanometer such that the sample is excited along different angles by the plurality of excitation beams as the sample holder is rotated along the centrifugal pathway.

Figure 1:
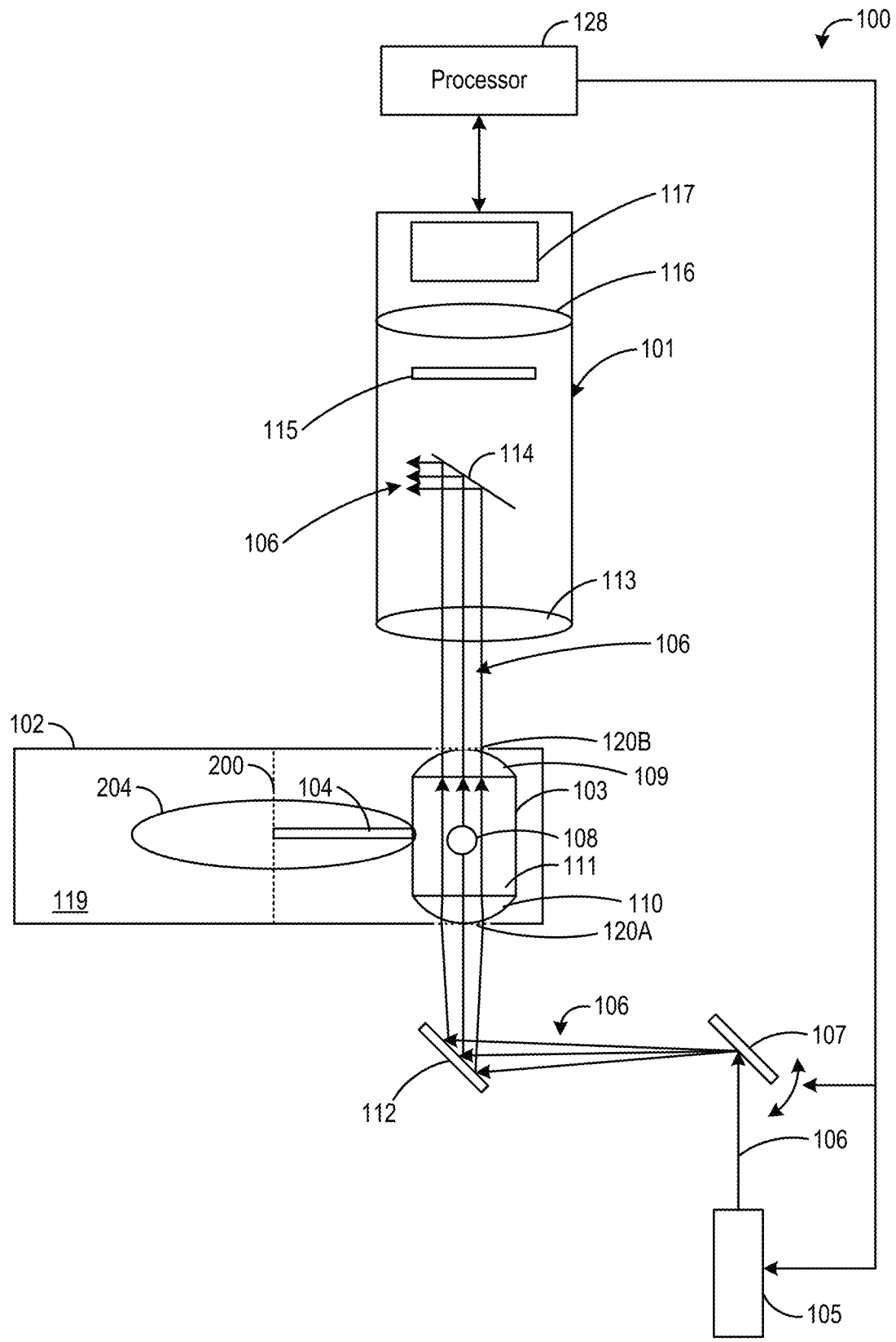
FIG. 1 is a simplified illustration of an illustrative embodiment of the fluorescence scanning system showing the use of a galvanometer to scan the sample with an excitation beam.
Figure 2:
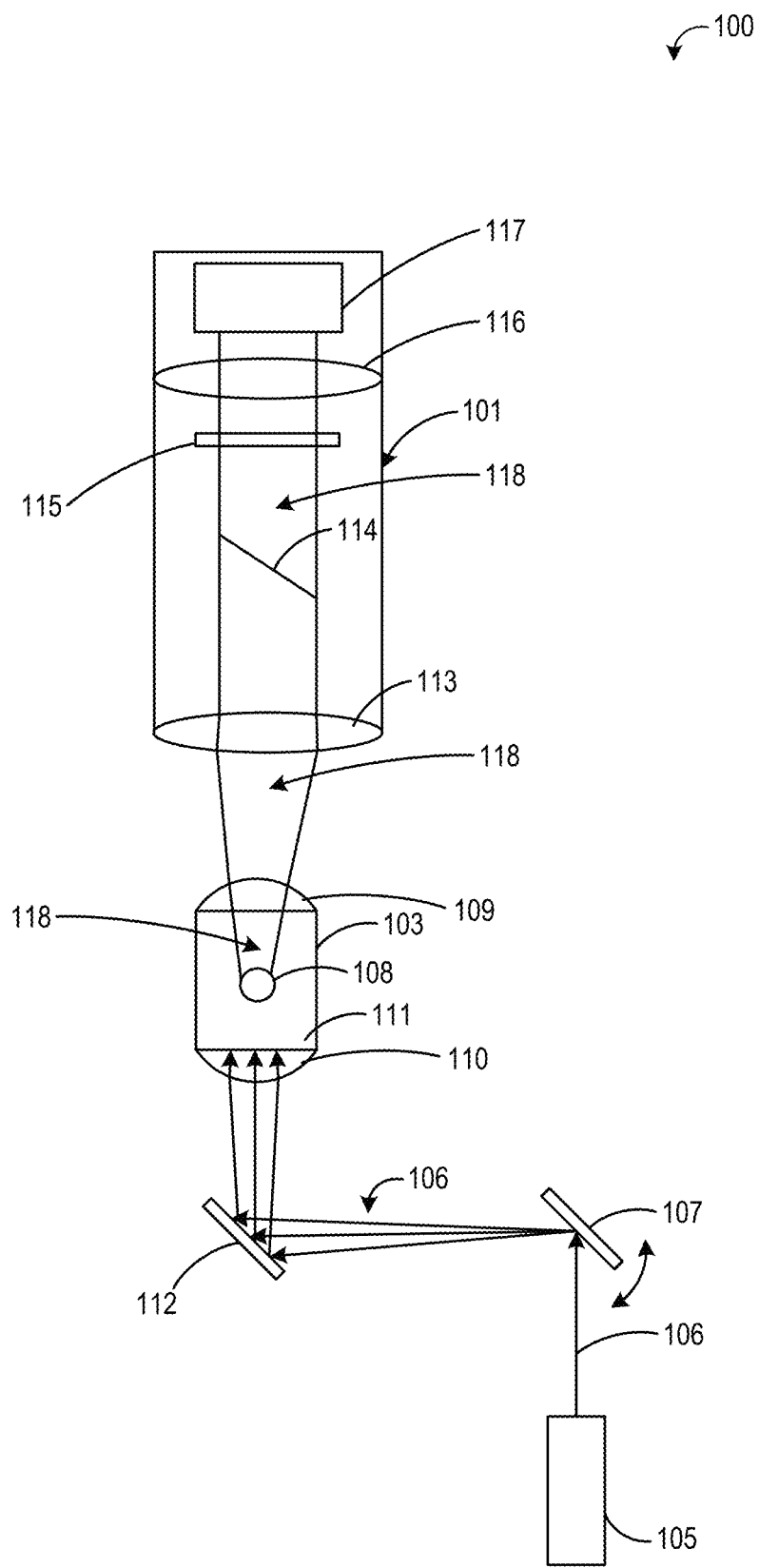
FIG. 2 is a simplified illustration of the fluorescence scanning system of FIG. 1 showing the detection of the fluorescence emissions from the sample by a stationary fluorescence detector.

Referring to the drawings, embodiments of a fluorescence scanning system for analytical ultracentrifugation are illustrated and generally indicated as 100 in FIGS. 1-4. As shown in FIGS. 1 and 2, in some embodiments the fluorescence scanning system 100 includes a centrifuge 102 (FIG. 1) having a chamber 119 that generally encompasses a sample holder 103, a rotor 104, and a 360 degree travel path 204. The centrifuge 102 rotates the sample holder 103 by operation of the rotor 104 that rotates the sample holder 103 around the 360 degree travel path 204 about an axis 200 of the centrifuge 102 in a lateral direction. As shown in FIG. 1, the sample holder 103 and the rotor 104 are within the chamber 119 of the centrifuge 102. The rotor 104 extends laterally across the chamber 119. The sample holder 103 is rotated within an enclosed chamber at about 60,000 rpms by the centrifuge 102. In some embodiments the centrifuge 102 may define opposing apertures 120A and 120B at a point along the 360 degree travel path 204 such that the sample holder 103 passes by the aperture 120A for excitation of a sample 108 and aperture 120B for detection of the fluorescence emissions 118 as shall be discussed in greater detail below.

In addition, the fluorescence scanning system 100 includes a stationary fluorescence detector 101 for detection of fluorescence emissions 118 emitted by the sample 108 and detected through the sample holder 103. In this arrangement, the stationary fluorescence detector 101 that detects the fluorescence emissions 118 and an illumination source 105 that excites the sample 108 are located outside the chamber 119 of the centrifuge 102 rather than being located within the limited confines of the chamber 119. In addition, the stationary fluorescence detector 101 is in periodic communication with the sample holder 103 as it travels within the chamber 119 of the centrifuge 102 through the opposite apertures 120A/120B. In some embodiments, the centrifuge 102 may be a Beckman Coulter ultracentrifuge having an analytical rotor (e.g., holes to receive the sample holder 103).

In some embodiments, the illumination source 105 emits a collimated excitation beam 106, for example a collimated laser beam, onto a galvanometer 107 that is operable for changing the angle of the collimated excitation beam 106, thereby modulating the position of the collimated excitation beam 106 relative to the sample 108 within the sample holder 103 and allowing the sample 108 to be scanned radially as it is rotated within the centrifuge 102. In this arrangement, the collimated excitation beam 106 does not need to traverse the sample 108 parallel to the axis 200 of the sample 108 rotation about the centrifuge 102. In this manner, deviations can be computationally accounted for in the data interpretation by a processor 128 in operative communication with the fluorescence scanning system. As shown, the collimated excitation beam 106 is reflected off a stationary mirror 112 and through the aperture 120A such that the sample 108 becomes illuminated and excited as the sample holder 103 travels over the aperture 120A of the centrifuge 102.

As shown, the sample holder 103 defines a chamber 111 having a proximal plano-convex lens window 110 at one end of the chamber 111 and a distal plano-convex lens window 109 at the opposite end of the chamber 111. In some embodiments, the convex portion of the proximal plano-convex lens window 110 is formed along the exterior of the sample holder 103 in communication with the chamber 111 while the plano portion of the proximal plano-convex lens window 110 is formed along the interior of the sample holder 103. Similarly, the convex portion of the distal plano-convex lens window 109 is formed along the exterior of the sample holder 103 in communication with the opposite side of the chamber 111, while the plano portion of the proximal plano-convex lens window 109 is formed along the interior of the sample holder 103. In one aspect, the slightly curved configuration of the convex portion of the proximal plano-convex lens window 109 allows the excitation beams 106 to have a more parallel orientation relative to the axis 200 of the rotation of the centrifuge 102 for the rotor 104. In some embodiments, both the distal and proximal plano-convex lens windows 109 and 110 may be sapphire lenses that act as windows into the chamber 111 of the sample holder 103 to provide a seal for the sample 108 in the chamber 111 and to let the collimated excitation beams 106 enter the chamber 111 to sufficiently illuminate the sample 108 as well as permit the fluorescence emissions 118 emitted by the sample 108 to exit the chamber 111 at the correct orientation for detection by the stationary fluorescence detector 101.

In some embodiments, the stationary fluorescence detector 101 includes a first detector lens 113 for focusing the fluorescence emissions 118 emitted from the sample holder 103 by the sample 108 through a dichroic mirror 114 before passing through laser line filter 115. The fluorescence emissions 118 are then focused onto a photomultiplier tube 117 by a second detector lens 116 for detection as shown in FIG. 2. In addition, as shown in FIG. 1, the stationary fluorescence detector 101 separates the excitation beams 106 from the fluorescence emissions 118 that both emit from the sample holder 103 and pass through first detector lens 113. As noted above, the fluorescence emissions 118 that pass through the first detector lens 113 also pass through the dichroic mirror 114; however, the dichroic mirror 114 is operable to reflect the excitation beams 106 that pass through the first detector lens 113 such that only fluorescence emissions 118 are received by the photomultiplier tube 117.

In some embodiments, a processor 128 is in operative communication with the centrifuge 102, the fluorescence detector 101, galvanometer 107 and/or illumination source 105 for performing the functionalities of the fluorescence scanning system 100 related to sample illumination, fluorescence detecting, and sample imaging.

Figure 3:
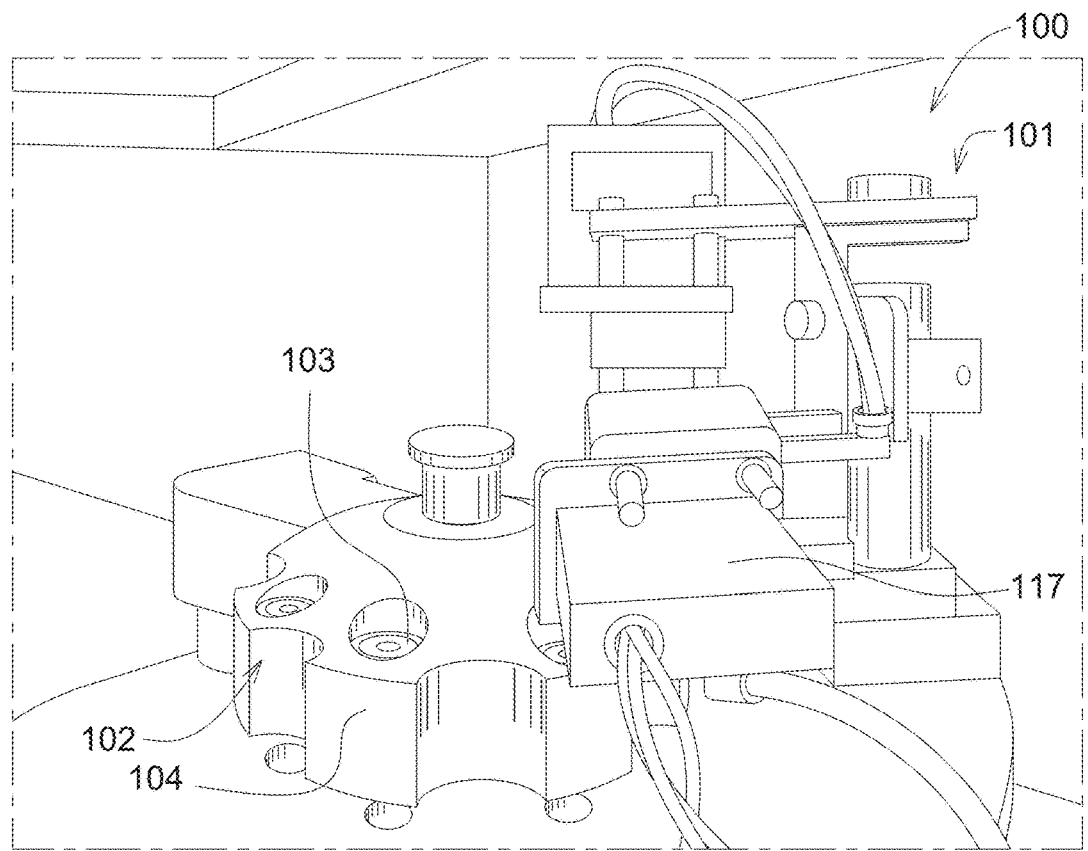
FIG. 3 is a photograph showing an illustrative prototype for testing the operation of the fluorescence scanning system.
Figure 4:
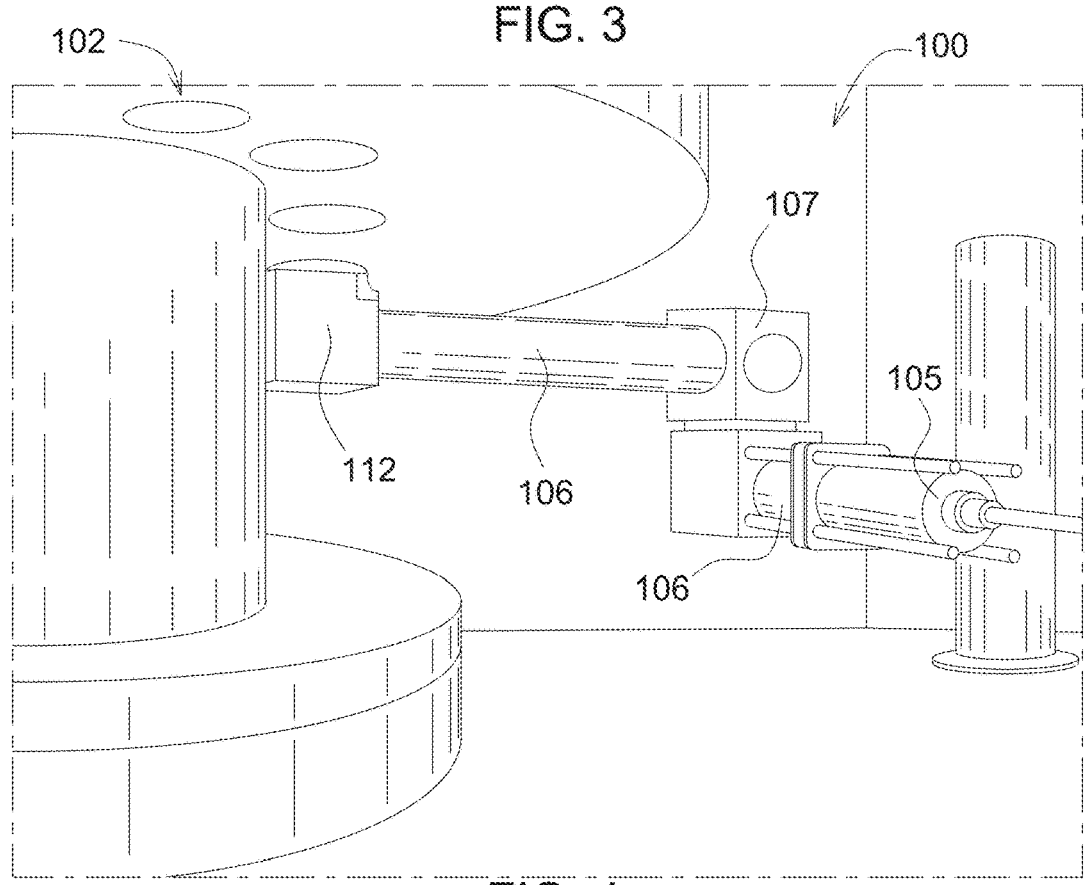
FIG. 4 is a photograph showing an illustrative prototype in which the excitation beam is shown exiting the laser collimator, reflected on a mirror and onto a galvanometer to a final mirror positioned underneath the rotor of the ultracentrifuge.

Referring to FIGS. 3 and 4, a prototype was set up to test the efficacy of the fluorescence scanning system 100 in which the sample holder 103 was placed in a centrifuge 102 and an illumination source 105 transmits the excitation beam 106 to the sample holder 103 by an arrangement of the galvanometer 107 and stationary mirror 112 that scans the sample (not shown) for detection by the photomultiplier 117 in the fluorescence detector 101 (FIG. 3).

REFERENCE NUMBERS

100. Fluorescence Scanning System
101. Fluorescence Detector
102. Centrifuge
103. Sample Holder-Centrifuge
104. Rotor-Centrifuge
105. Illumination Source
106. Excitation Beam
107. Galvanometer
108. Sample
109. Distal Plano-Convex Lens Window-Sample Holder
110. Proximal Plano-Convex Lens Window-Sample Holder
111. Chamber-Sample Holder
112. Stationary Mirror
113. First Detector Lens-Fluorescence Detector
114. Dichroic Mirror-Fluorescence Detector
115. Laser Line Filter-Fluorescence Detector
116. Second Detector Lens-Fluorescence Detector
117. Photomultiplier Tube-Fluorescence Detector
118. Fluorescence Emissions
119. Chamber-Centrifuge
120A/B. Apertures-Centrifuge
128 Processor
200. Axis of Centrifugal Rotation
204. Travel Path It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 724 (2d. Ed. 1995).

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it is understood that the particular value forms another aspect. It is further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. It is also understood that throughout the application, data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed. In this regard, ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A fluorescence scanning system comprising:
   a centrifuge including a centrifuge chamber and a rotor extending laterally across the centrifuge chamber, wherein the rotor is operable for rotation about an axis of the centrifuge;
   a sample holder engaged to the rotor for 360 degree rotation of the sample holder along a travel path, the sample holder including an inner sample holder chamber wherein a proximal plano-convex lens window is positioned at a first end of the sample holder and a distal plano-convex lens window is positioned at an opposite second end of the sample holder;
   a sample disposed inside the inner sample holder chamber of the sample holder;
   an illumination source for generating and transmitting a collimated excitation beam;
   a galvanometer in operative association with the illumination source for scanning the collimated excitation beam at different angles along the sample disposed within the sample holder;
   a stationary mirror in operative communication with the galvanometer for transmitting the collimated excitation beam into the sample holder through the proximal plano-convex lens window and illuminating the sample to generate fluorescence emissions; and
   a stationary fluorescence detector in operative communication with the sample holder at a point along the travel path of rotation of the sample holder for detecting the fluorescence emissions and collimated excitation beam emitted from the sample holder.

2. The system of claim 1, wherein the stationary fluorescence detector comprises a dichroic mirror operable for separating the collimated excitation beam from the fluorescence emissions emitted from the sample holder such that the collimated excitation beam is deflected by the dichroic mirror and the fluorescence emissions passes through the dichroic mirror.

3. The system of claim 1, wherein the proximal plano-convex lens window is configured to focus the collimated excitation beam along different angles along the sample.

4. The system of claim 1, wherein the distal plano-convex lens window is configured to focus the fluorescence emissions emitted by the sample to the stationary fluorescence detector.

5. The system of claim 1, wherein the proximal plano-convex lens window and the distal plano-convex lens window comprise a sapphire lens.

6. The system of claim 1, wherein the proximal plano-convex lens window and the distal plano-convex lens window each comprise a convex portion that allows the excitation beam to have a more parallel orientation relative to the axis of rotation of the rotor of the centrifuge.

7. The system of claim 1, wherein the stationary mirror is oriented at a 45 degree angle relative to the galvanometer.

8. The system of claim 1, wherein the sample is suspended in a liquid within the inner sample holder chamber of the sample holder.

9. The system of claim 1, wherein the stationary fluorescence detector comprises a first detection lens for focusing the excitation beam and the operable for separating the excitation beam from the fluorescence emissions.

10. The system of claim 1, wherein the dichroic mirror is operable for deflecting the excitation beam off the dichroic mirror while allowing the fluorescence emissions to pass through the dichroic mirror.

11. The system of claim 1, wherein the proximal plano-convex lens window is configured to modulate the angle of entry of the excitation beam into the sample.

12. The system of claim 1, wherein the sample is scanned radially by the excitation beam.

13. The system of claim 1, wherein the centrifuge defines opposing apertures for permitting illumination of the sample by the excitation beam and detection of the fluorescence emissions along a one to three degree window defined along the travel path of the sample holder.

14. The system of claim 1, wherein the sample is exposed for illumination and detection in a 1 microsecond period of time along the travel path of the sample holder.

15. The system of claim 1, wherein the proximal plano-convex lens window defines a convex portion and an opposite plano portion and wherein the distal plano-convex lens window also defines a convex portion and an opposite plano portion, wherein the plano portions of the distal and proximal plano-convex lens windows communicate with the inner sample holder chamber of the sample holder and the convex portions of the distal and proximal plano-convex lens windows communicate with the exterior of the sample holder.

* * * * *